US012666412B2

(12) United States Patent
Lee et al.

(10) Patent No.: US 12,666,412 B2
(45) Date of Patent: Jun. 23, 2026

(54) METHOD OF TRANSMITTING OR RECEIVING DOWNLINK CONTROL INFORMATION INCLUDING RESOURCE ALLOCATION INFORMATION AND APPARATUS THEREFOR

(71) Applicant: LG Electronics Inc., Seoul (KR)

(72) Inventors: Youngdae Lee, Seoul (KR); Jaehyung Kim, Seoul (KR); Suckchel Yang, Seoul (KR); Seonwook Kim, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 18/549,475

(22) PCT Filed: Aug. 11, 2023

(86) PCT No.: PCT/KR2023/011912
§ 371 (c)(1),
(2) Date: Sep. 7, 2023

(87) PCT Pub. No.: WO2024/035193
PCT Pub. Date: Feb. 15, 2024

(65) Prior Publication Data
US 2025/0024441 A1 Jan. 16, 2025

Related U.S. Application Data

(60) Provisional application No. 63/397,366, filed on Aug. 11, 2022.

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0053* (2013.01); *H04W 72/0457* (2023.01);
(Continued)

(58) Field of Classification Search
CPC ............. H04W 72/0453; H04W 72/23; H04W 72/232; H04W 72/0457; H04W 72/1273; H04L 5/0053; H04L 5/0044
See application file for complete search history.

(56) References Cited

U.S. PATENT DOCUMENTS

2019/0261405 A1 8/2019 Ang et al.
2020/0067688 A1* 2/2020 Li .......................... H04L 5/001
(Continued)

FOREIGN PATENT DOCUMENTS

DE 10-2021-110664 A1 10/2021
WO WO 2021/133678 7/2021
(Continued)

OTHER PUBLICATIONS

Extended European Search Report in European Appln. No. 23758198.8, mailed on Oct. 8, 2024, 9 pages.
(Continued)

*Primary Examiner* — Omar J Ghowrwal
(74) *Attorney, Agent, or Firm* — Fish & Richardson P.C.

(57) ABSTRACT
According to an embodiment, a user equipment (UE) receives downlink control information (DCI) through a physical downlink control channel (PDCCH), determines a downlink resource allocated to the UE based on a frequency domain resource allocation (FDRA) field included in the DCI, and receives a physical downlink shared channel (PDSCH) in the downlink resource, and in this case, based on that a first bandwidth of the UE supported for the PDCCH is different from a second bandwidth of the UE supported for the PDSCH, the UE determines the downlink resource allocated through the FDRA field based on the second bandwidth other than the first bandwidth.

10 Claims, 9 Drawing Sheets

(51) Int. Cl.

| | |
|---|---|
| *H04W 72/0457* | (2023.01) |
| *H04W 72/1273* | (2023.01) |
| *H04W 72/23* | (2023.01) |
| *H04W 72/232* | (2023.01) |

(52) U.S. Cl.
CPC ....... *H04W 72/1273* (2013.01); *H04W 72/23* (2023.01); *H04W 72/232* (2023.01); *H04L 5/0044* (2013.01)

(56) References Cited

U.S. PATENT DOCUMENTS

| | | | |
|---|---|---|---|
| 2021/0029726 A1* | 1/2021 | Papasakellariou .... | H04W 72/23 |
| 2022/0322314 A1* | 10/2022 | Rastegardoost ...... | H04W 72/23 |
| 2024/0049199 A1* | 2/2024 | Abotabl ............... | H04W 72/23 |
| 2024/0224289 A1* | 7/2024 | Lee ..................... | H04W 72/232 |
| 2024/0314754 A1* | 9/2024 | Liu ..................... | H04W 72/231 |

FOREIGN PATENT DOCUMENTS

| | | |
|---|---|---|
| WO | WO 2021/147002 | 7/2021 |
| WO | WO 2021/168789 | 9/2021 |
| WO | WO 2022/021223 | 2/2022 |

OTHER PUBLICATIONS

International Search Report in International Appln. No. PCT/KR2023/011912, mailed Nov. 22, 2023, 10 pages.
ZTE, Sanechips, "Discussion on further RedCap UE complexity reduction, " RI- 2203600, 3GPP TSG RAN WG1 #109-e, e-Meeting, Apr. 29, 2022, 13 pages.

\* cited by examiner

FIG. 1

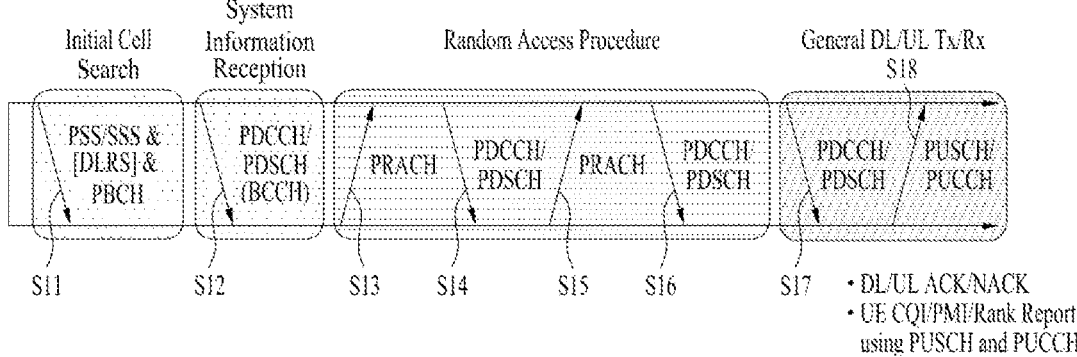

Initial Cell Search

System Information Reception

Random Access Procedure

General DL/UL Tx/Rx S18

| PSS/SSS & [DLRS] & PBCH | PDCCH/ PDSCH (BCCH) | PRACH | PDCCH/ PDSCH | PRACH | PDCCH/ PDSCH | PDCCH/ PDSCH | PUSCH/ PUCCH |

S11        S12        S13      S14      S15      S16        S17

• DL/UL ACK/NACK
• UE CQI/PMI/Rank Report using PUSCH and PUCCH

FIG. 2

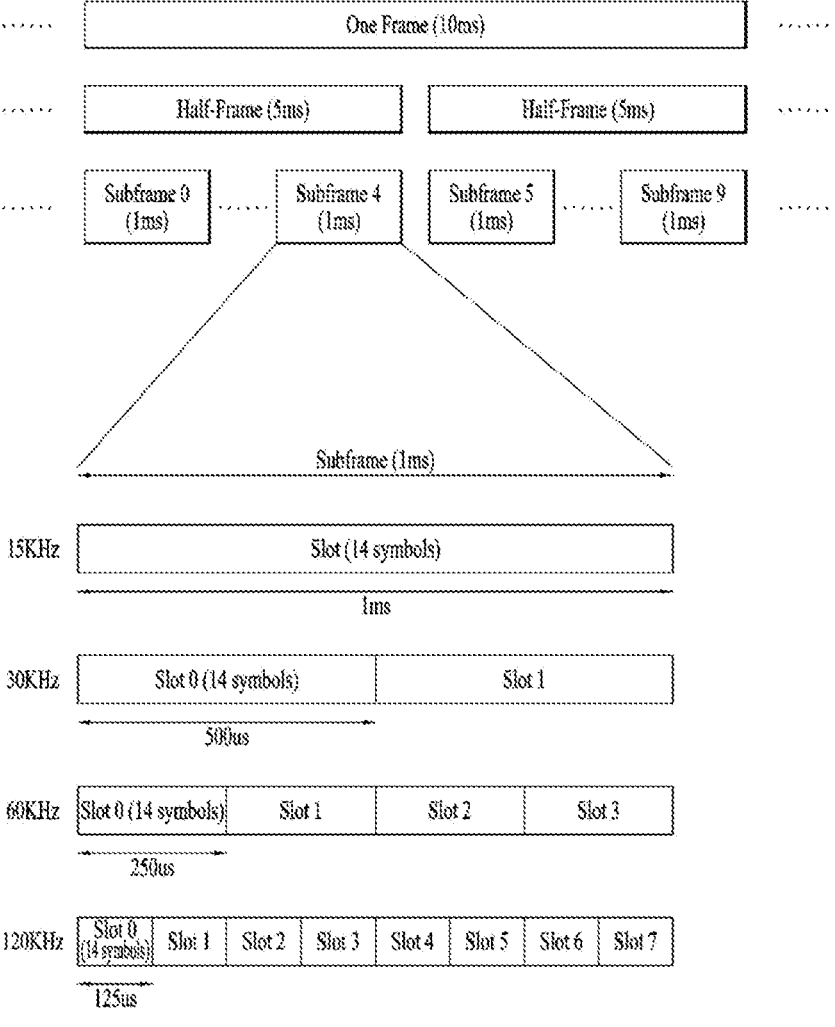

One Frame (10ms)

Half-Frame (5ms)          Half-Frame (5ms)

Subframe 0 (1ms)    Subframe 4 (1ms)    Subframe 5 (1ms)    Subframe 9 (1ms)

Subframe (1ms)

15KHz    | Slot (14 symbols) |
1ms

30KHz    | Slot 0 (14 symbols) | Slot 1 |
500us

60KHz    | Slot 0 (14 symbols) | Slot 1 | Slot 2 | Slot 3 |
250us

120KHz   | Slot 0 (14 symbols) | Slot 1 | Slot 2 | Slot 3 | Slot 4 | Slot 5 | Slot 6 | Slot 7 |
125us

FIG. 4
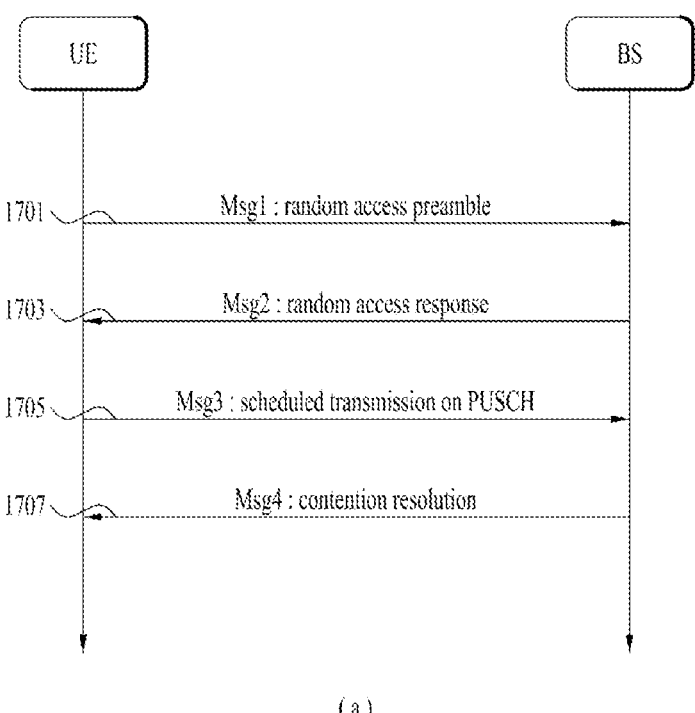
1701       Msg1 : random access preamble
1703       Msg2 : random access response
1705       Msg3 : scheduled transmission on PUSCH
1707       Msg4 : contention resolution
( a )
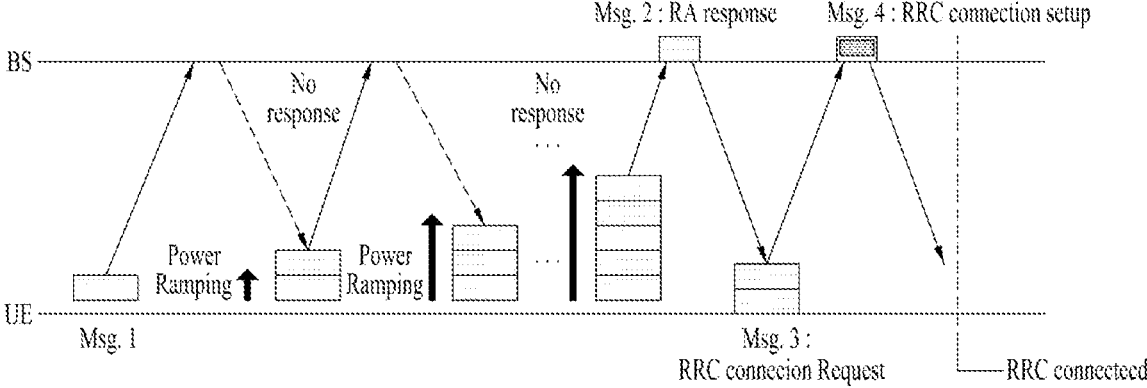

FIG. 10
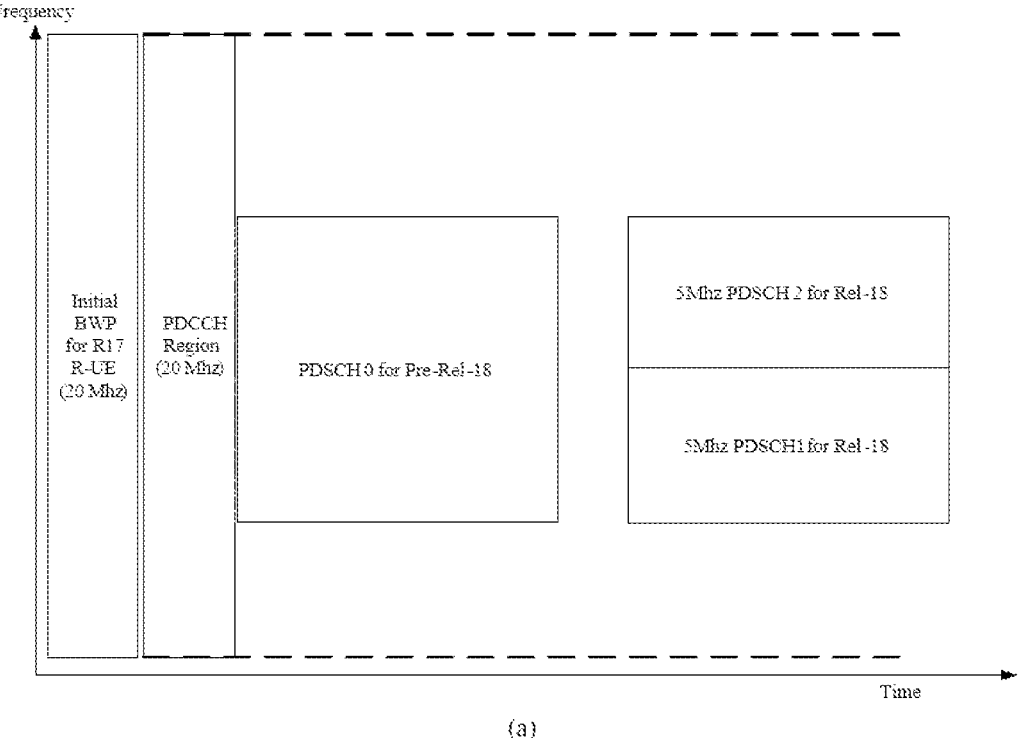
(a)
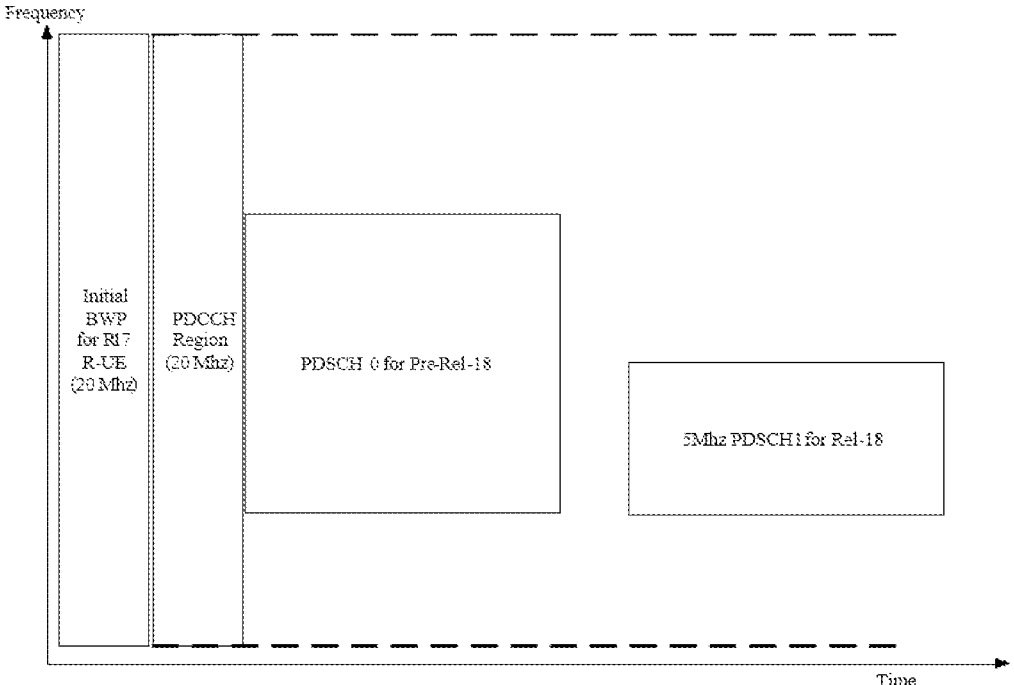
(b)

FIG. 11

Nominal RBG size P

| Bandwidth Part Size | Configuration 1 | Configuration 2 |
|---|---|---|
| 1 – 36 | 2 | 4 |
| 37 – 72 | 4 | 8 |
| 73 – 144 | 8 | 16 |
| 145 – 275 | 16 | 16 |

The total number of RBGs ($N_{RBG}$) for a downlink bandwidth part $i$ of size $N^{size}_{BWP,i}$ PRBs is given by $$N_{RBG} = \left\lceil \left( N^{size}_{BWP,i} + \left( N^{start}_{BWP,i} \bmod P \right) \right) / P \right\rceil, \text{ where}$$

- the size of the first RBG is $RBG^{size}_0 = P - N^{start}_{BWP,i} \bmod P$,

- the size of last RBG is $RBG^{size}_{last} = \left( N^{start}_{BWP,i} + N^{size}_{BWP,i} \right) \bmod P$ if $\left( N^{start}_{BWP,i} + N^{size}_{BWP,i} \right) \bmod P > 0$ and $P$ otherwise,

- the size of all other RBGs is $P$.

FIG. 12

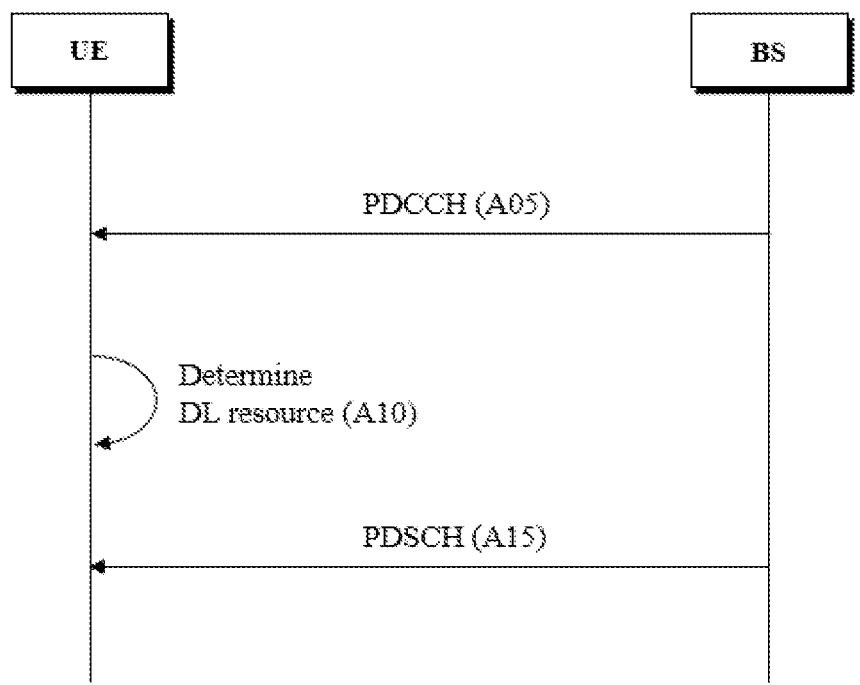

METHOD OF TRANSMITTING OR RECEIVING DOWNLINK CONTROL INFORMATION INCLUDING RESOURCE ALLOCATION INFORMATION AND APPARATUS THEREFOR

CROSS-REFERENCE TO RELATED APPLICATIONS

This application is a National Stage application under 35 U.S.C. § 371 of International Application No. PCT/KR2023/011912, filed on Aug. 11, 2023, which claims the benefit of U.S. Provisional Application No. 63/397,366, filed on Aug. 11, 2022. The disclosures of the prior applications are hereby incorporated by reference herein in their entirety.

TECHNICAL FIELD

The present disclosure relates to wireless communication, and more particularly, to a method of transmitting or receiving an uplink/downlink signal in a wireless communication system and apparatus therefor.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The object of the present disclosure is to provide a method of transmitting and receiving signals more accurately and efficiently.

The objects of present disclosure are not limited to what has been particularly described hereinabove, and other objects that the present disclosure could achieve will be more clearly understood from the following detailed description.

Technical Solution

According to an aspect, a method of receiving a signal by a user equipment (UE) in a wireless communication system includes receiving downlink control information (DCI) through a physical downlink control channel (PDCCH), determining a downlink resource allocated to the UE based on a frequency domain resource allocation (FDRA) field included in the DCI, and receiving a physical downlink shared channel (PDSCH) in the downlink resource, wherein, based on that a first bandwidth of the UE supported for the PDCCH is different from a second bandwidth of the UE supported for the PDSCH, the UE determines the downlink resource allocated through the FDRA field based on the second bandwidth other than the first bandwidth.

The second bandwidth may be smaller than the first bandwidth.

The first bandwidth may be equal to or greater than 5 MHz and the second bandwidth may be equal to or smaller than 5 MHz.

A frequency domain related to the second bandwidth may belong to a first Bandwidth part (BWP), and the first BWP may be shared with other UEs supporting PDSCH reception of a greater bandwidth than the second bandwidth.

A frequency domain related to the second bandwidth may be one of a plurality of sub-BWPs included in the first BWP.

The DCI may include information for configuring one of the plurality of sub-BWPs included in the first BWP as the frequency domain related to the second bandwidth.

The UE may determine the downlink resource allocated by the FDRA field within a frequency domain related to the second bandwidth.

A total number of resource block groups (RBGs) related to the PDSCH and physical resource blocks (PRBs) may be determined based on the second bandwidth.

According to another aspect, a processor-readable recording medium having recorded thereon a program for performing the aforementioned signal receiving method may be provided.

According to another aspect, a user equipment (UE) for performing the aforementioned signal receiving method may be provided.

According to another aspect, a device for controlling a user equipment (UE) performing the aforementioned signal receiving method may be provided.

According to another aspect, a method of transmitting a signal by a base station (BS) in a wireless communication system includes transmitting, to a user equipment (UE), downlink control information (DCI) through a physical downlink control channel (PDCCH), and transmitting a physical downlink shared channel (PDSCH) in a downlink resource allocated to the UE based on a frequency domain resource allocation (FDRA) field included in the DCI, wherein, based on that a first bandwidth of the UE supported for the PDCCH is different from a second bandwidth of the UE supported for the PDSCH, the downlink resource allocated through the FDRA field is determined based on the second bandwidth other than the first bandwidth.

According to another aspect, a base station (BS) for performing the aforementioned signal transmitting method may be provided.

Advantageous Effects

According to an embodiment of the present disclosure, signal transmission and reception can be performed more accurately and efficiently in a wireless communication system.

The effects of present disclosure are not limited to what has been particularly described hereinabove, and other effects that the present disclosure could achieve will be more clearly understood from the following detailed description.

BRIEF DESCRIPTION OF THE DRAWINGS

FIG. 1 illustrates physical channels used in a 3rd generation partnership project (3GPP) system as an exemplary wireless communication system, and a general signal transmission method using the same.

FIG. 2 illustrates a radio frame structure.

FIG. 4 illustrates a random access procedure.

FIG. 10 shows an example of methods of allocating a PDSCH resource according to an embodiment.

FIG. 11 is a diagram for explaining configuration of a size of a RBG depending on a BWP size.

FIG. 12 is a diagram for explaining transmission and reception of a PDSCH according to an embodiment.

MODE FOR INVENTION

Figure 3:
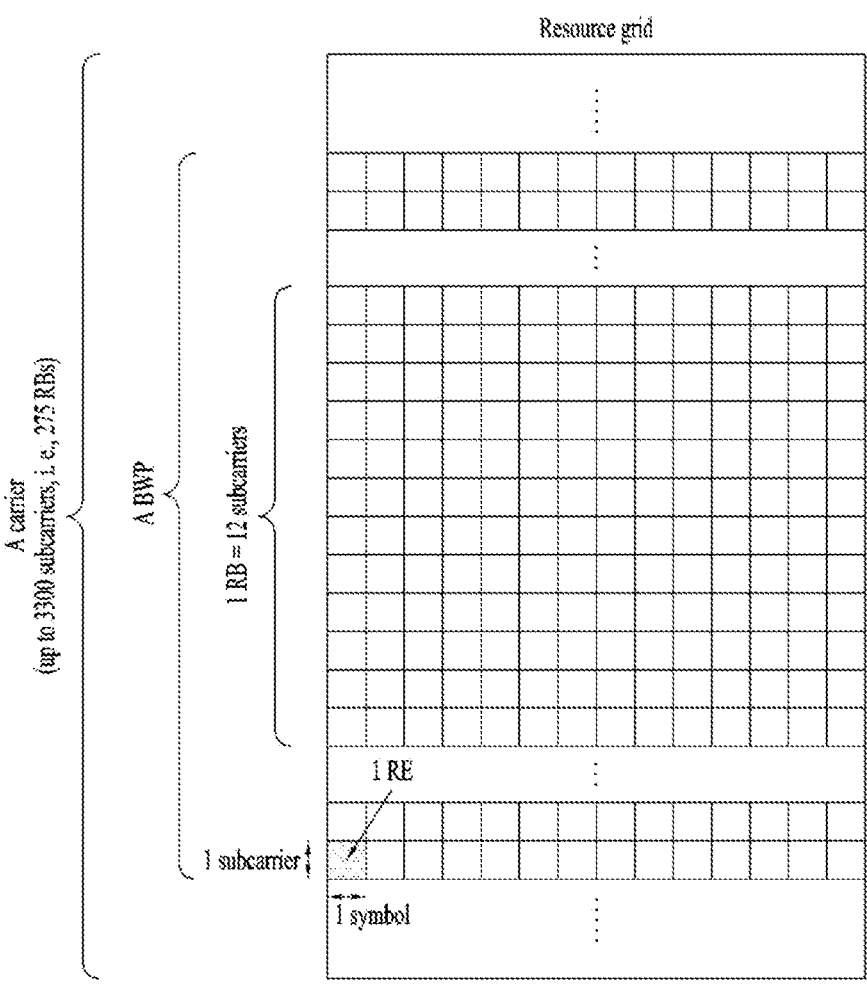
FIG. 3 illustrates a resource grid of a slot.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto. LTE refers to technologies after 3GPP TS 36.xxx Release 8. Specifically, LTE technologies after 3GPP TS 36.xxx Release 10 are referred to as LTE-A, and LTE technologies after 3GPP TS 36.xxx Release 13 are referred to as LTE-A pro. 3GPP NR refers to technologies after TS 38.xxx Release 15. LTE/NR may be referred to as 3GPP systems. In this document, "xxx" represents the detail number of a specification. LTE/NR may be collectively referred to as 3GPP systems.

Details of the background, terminology, abbreviations, etc. used herein may be found in documents published before the present disclosure. For example, the present disclosure may be supported by the following documents: 3GPP NR 3GPP TS 38.211: Physical channels and modulation 3GPP TS 38.212: Multiplexing and channel coding 3GPP TS 38.213: Physical layer procedures for control 3GPP TS 38.214: Physical layer procedures for data 3GPP TS 38.215: Physical layer measurements 3GPP TS 38.300: NR and NG-RAN Overall Description 3GPP TS 38.304: User Equipment (UE) procedures in idle mode and in RRC inactive state 3GPP TS 38.321: Medium Access Control (MAC) protocol 3GPP TS 38.322: Radio Link Control (RLC) protocol 3GPP TS 38.323: Packet Data Convergence Protocol (PDCP)

3GPP TS 38.331: Radio Resource Control (RRC) protocol

3GPP TS 37.324: Service Data Adaptation Protocol (SDAP)

3GPP TS 37.340: Multi-connectivity; Overall description

3GPP TS 23.287: Application layer support for V2X services; Functional architecture and information flows 3GPP TS 23.501: System Architecture for the 5G System 3GPP TS 23.502: Procedures for the 5G System 3GPP TS 23.503: Policy and Charging Control Framework for the 5G System; Stage 2

3GPP TS 24.501: Non-Access-Stratum (NAS) protocol for 5G System (5GS); Stage 3

3GPP TS 24.502: Access to the 3GPP 5G Core Network (5GCN) via non-3GPP access networks 3GPP TS 24.526: User Equipment (UE) policies for 5G System (5GS); Stage 3

Technical Terms Used in this Document

UE: User Equipment

SSB: Synchronization Signal Block

MIB: Master Information Block

RMSI: Remaining Minimum System Information

FR1: Frequency Range 1. Refers to the frequency range below 6 GHz (eg, 450 MHz to 6000 MHz).

FR2: Frequency Range 2. Refers to the millimeter wave (mmWave) region above 24 GHz (eg, 24250 MHz to 52600 MHz).

BW: Bandwidth

BWP: Bandwidth Part

RNTI: Radio Network Temporary Identifier

CRC: Cyclic Redundancy Check

SIB: System Information Block

SIB1: SIB1 for NR devices=RMSI (Remaining Minimum System Information). Broadcasts information necessary for cell access of NR UEs.

CORESET (COntrol REsource SET): Time/frequency resource at which the NR UEs attempt to decode PDCCH candidates CORESET #0: CORESET for Type0-PDCCH CSS set for NR devices (configured based on MIB)

Type0-PDCCH CSS set: a search space set in which an NR UE monitors a set of PDCCH candidates for a DCI format with CRC scrambled by a SI-RNTI MO: PDCCH Monitoring Occasion for Type0-PDCCH CSS set SIB1-R: (additional) SIB1 for reduced capability NR devices. SIB1-R can be generated as a TB separate from SIB1 and transmitted through a separate PDSCH.

CORESET #0-R: CORESET #0 for reduced capability NR devices

Type0-PDCCH-R CSS set: a search space set in which an redcap UE monitors a set of PDCCH candidates for a DCI format with CRC scrambled by a SI-RNTI MO-R: PDCCH Monitoring Occasion for Type0-PDCCH CSS set Cell defining SSB (CD-SSB): SSB including RMSI scheduling information among NR SSBs Non-cell defining SSB (non-CD-SSB): Refers to an SSB that is placed in the NR sync raster, but does not include the RMSI scheduling information of the cell for measurement. However, non-CD-SS may contain information that points to the location of the cell defining SSB.

SCS: subcarrier spacing

SI-RNTI: System Information Radio-Network Temporary Identifier

Camp on: "Camp on" is the UE state in which the UE stays on a cell and is ready to initiate a potential dedicated service or to receive an ongoing broadcast service.

TB: Transport Block

RSA (Redcap standalone): Cells that support only Redcap devices or services.

SIB1(-R)-PDSCH: SIB1(-R) transmitting PDSCH

SIB1(-R)-DCI: SIB1(-R)-PDSCH scheduling DCI. DCI format 1_0 with CRC scrambled by SI-RNTI.

SIB1(-R)-PDCCH: SIB1(-R)-DCI transmitting PDCCH

FDRA: Frequency Domain Resource Allocation

TDRA: Time Domain Resource Allocation

RA: Random Access

MSGA: preamble and payload transmissions of the random access procedure for 2-step RA type.

MSGB: response to MSGA in the 2-step random access procedure. MSGB may consist of response(s) for contention resolution, fallback indication(s), and backoff indication.

RO-N: RO(RACH Occasion) for normal UE 4-step RACH and 2-step RACH (if configured)

RO-N1, RO-N2: If separate RO is configured for normal UE 2-step RACH, classified as RO-N1(4-step), RO-N2(2-step)

RO-R: RO (RACH Occasion) set separately from RO-N for redcap UE 4-step RACH and 2-step RACH (if configured)

RO-R1, RO-R2: if a separate RO is configured for redcap UE 2-step RACH, classified as RO-R1 (4-step) and RO-R2 (2-step)

PG-R: MsgA-Preambles Group for redcap UEs

RAR: Randoma Access Response

RAR window: the time window to monitor RA response(s)

FH: Frequency Hopping iBWP: initial BWP iBWP-DL(-UL): initial DL(UL) BWP iBWP-DL(-UL)-R: (separate) initial DL(UL) BWP for RedCap CS: Cyclic shift NB: Narrowband In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/ understood from a process on the transmitting (or receiving) side in signal transmission/reception between wireless communication devices (e.g., a BS and a UE), its description may be omitted. Signal determination/generation/encoding/ transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, proposals and so on are distinguished from each other and indexed, for convenience of description, which does not mean that each of them necessarily constitutes an independent disclosure or that each of them should be implemented only individually. Unless explicitly contradicting each other, it may be derived/understood that at least some of the sections, embodiments, examples, options, methods, schemes, proposals and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

The SSB is composed of four consecutive OFDM symbols, each carrying the PSS, the PBCH, the SSS/PBCH, or the PBCH. Each of the PSS and the SSS includes one OFDM symbol by 127 subcarriers, and the PBCH includes three OFDM symbols by 576 subcarriers. The PBCH is encoded/ decoded based on Polar codes, and modulation/demodulation is performed thereon according to quadrature phase shift keying (QPSK). The PBCH in the OFDM symbol consists of data resource elements (REs) to which a complex modulation value of the PBCH is mapped, and demodulation reference signal (DMRS) REs to which a DMRS for the PBCH is mapped. Three DMRS REs are configured for each RB in the OFDM symbol, and three data REs configured between DMRS REs.

The PSS may be used in detecting a cell ID within a cell ID group, and the SSS may be used in detecting a cell ID group. The PBCH may be used in detecting an SSB (time) index and a half-frame. There are 336 cell ID groups, and each cell ID group includes three cell IDs. Thus, there are a total of 1008 cell IDs.

SSBs are periodically transmitted with an SSB periodicity. A default SSB periodicity assumed by the UE in initial cell search is defined as 20 ms. After cell access, the SSB periodicity may be set to one of {5 ms, 10 ms, 20 ms, 40 ms, 80 ms, and 160 ms} by the network (e.g., BS). An SSB burst set may be configured at the beginning of the SSB periodicity. The SSB burst set may be set to a time window of 5 ms (i.e., half-frame), and the SSB may be repeatedly transmitted up to L times within the SS burst set. The maximum number of SSB transmissions L may be given depending carrier frequency bands as follows. One slot includes up to two SSBs.

For frequency range up to 3 GHz, L=4

For frequency range from 3 GHz to 6 GHz, L=8

For frequency range from 6 GHz to 52.6 GHz, L=64

The time-domain positions of candidate SSBs in the SS burst set may be defined depending on subcarrier spacings. The time-domain positions of the candidate SSBs are indexed from (SSB indices) 0 to L-1 in temporal order within the SSB burst set (i.e., half-frame).

Multiple SSBs may be transmitted within the frequency span of a carrier. Each SSB may not need to have a unique physical layer cell identifier, but different SSBs may have different physical layer cell identifiers.

The UE may acquire DL synchronization by detecting the SSB. The UE may identify the structure of the SSB burst set based on the detected SSB (time) index, and thus the UE may detect a symbol/slot/half-frame boundary. A frame/half-frame number to which the detected SSB belongs may be identified based on system frame number (SFN) information and half-frame indication information.

Specifically, the UE may obtain a 10-bit SFN for a frame to which a PBCH belongs from the PBCH. Then, the UE may obtain 1-bit half-frame indication information. For example, when the UE detects the PBCH in which the half-frame indication bit is set to 0, the UE may determine that an SSB to which the PBCH belongs is included in the first half-frame of the frame. When the UE detects the PBCH in which the half-frame indication bit is set to 1, the UE may determine that an SSB to which the PBCH belongs is included in the second half-frame of the frame. Finally, the UE may obtain the SSB index of the SSB to which the PBCH belongs based on a DMRS sequence and a PBCH payload carried by the PBCH.

After initial cell search, the UE may acquire more specific system information by receiving a physical downlink control channel (PDCCH) and receiving a physical downlink shared channel (PDSCH) based on information of the PDCCH in step S102.

System information (SI) is divided into a master information block (MIB) and a plurality of system information blocks (SIBs). The SI except for the MIB may be referred to as remaining minimum system information (RMSI). Details thereof will be described in the following.

The MIB includes information/parameters for monitoring a PDCCH scheduling a PDSCH carrying SIB1 (SystemInformationBlock1), and the MIB is transmitted by the BS over the PBCH of an SSB. For example, the UE may check based on the MIB whether there is a CORESET for a Type0-PDCCH common search space. The Type0-PDCCH common search space is a kind of PDCCH search space, which is used to transmit a PDCCH scheduling an SI message. If the Type0-PDCCH common search space exists, the UE may determine (1) a plurality of contiguous RBs and one or more consecutive symbols included in the CORESET and (ii) a PDCCH occasion (e.g., a time-domain location for PDCCH reception, based on information (e.g., pdcch-ConfigSIB1) in the MIB. If the Type0-PDCCH common search space does not exist, pdcch-ConfigSIB1 provides information on a frequency location at which the SSB/SIB1 exists and information on a frequency range where there are no SSB/SIB1.

SIB1 includes information related to availability and scheduling (e.g., transmission periodicity, SI-window size, etc.) of the remaining SIBs (hereinafter referred to as SIBx where x is an integer more than or equal to 2). For example, SIB1 may indicate whether SIBx is periodically broadcast or provided at the request of the UE in an on-demand manner. When SIBx is provided in an on-demand manner, SIB1 may include information necessary for the UE to send an SI request. SIB1 is transmitted over a PDSCH, and a PDCCH scheduling SIB1 is transmitted in the Type0-PDCCH common search space. That is, SIB1 is transmitted over the PDSCH indicated by the PDCCH.

SIBx is included in the SI message and transmitted on the PDSCH. Each SI message is transmitted within a periodically occurring time window (i.e., SI-window).

The UE may perform a random access procedure (e.g., 4-step RA procedure) to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

Hereinafter, a 2-step random access procedure will be described in brief. In the 2-step random access procedure, S103/S105 may be performed in one step (where the UE performs transmission) (message A), and S104/S106 may be performed in one step (where the BS performs transmission) (message B). Message A (MsgA) may include a preamble and a payload (PUSCH payload), and the preamble and payload may be multiplexed based on time division multiplexing (TDM). In response to MsgA, message B (MsgB) may be transmitted for contention resolution, fallback indication(s), and/or backoff indication. The 2-step random access procedure may be subdivided into a contention-based random access (CBRA) procedure and a contention-free random access (CFRA) procedure. In the CFRA procedure, the BS may provide the UE with information on a preamble that the UE needs to transmit in MsgA and information on PUSCH allocation before the UE transmits MsgA.

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

The MR system may support signal transmission/reception in unlicensed bands. According to regional regulations for unlicensed bands, a communication node in an unlicensed band needs to determine whether a channel is used by other communication node(s) before transmitting a signal. Specifically, the communication node may perform carrier sensing (CS) before transmitting the signal so as to check whether the other communication node(s) perform signal transmission. When it is determined that the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. When it is determined that the channel is idle, the communication node may start the signal transmission in a UCell. The sires of processes described above may be referred to as Listen-Before-Talk (LBT) or a channel access procedure (CAP). The LBT and CAP may be interchangeably used in this document.

FIG. 2 illustrates a radio frame structure. In NR, uplink and downlink transmissions are configured with frames. Each radio frame has a length of 10 ms and is divided into two 5-ms half-frames (IF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame, u}_{slot}$: Number of slots in a frame
$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Bandwidth Part (BWP)

The NR system may support up to 400 MHz for each carrier. The network may instruct the UE to operate only in a partial bandwidth rather than the whole bandwidth of such a wideband carrier. The partial bandwidth is referred to as a BWP. The BWP refers to a subset of contiguous common RBs defined for a numerology in the BWP of a carrier in the frequency domain, and one numerology (e.g., SCS, CP length, slot/mini-slot duration, etc.) may be configured.

Activation/deactivation of a DL/UL BWP or BWP switching may be performed according to network signaling and/or timers (e.g., L1 signaling corresponding to a physical layer control signal, a MAC control element corresponding to a MAC layer control signal, RRC signaling, etc.). While performing initial access or before setting up an RRC connection, the UE may not receive any DL/UL BWP configurations. A DL/UL BWP that the UE assumes in this situation is referred to as an initial active DL/UL BWP.

FIG. 4 illustrates an exemplary normal random access procedure. Specifically, FIG. 4 shows a contention-based random access procedure of the UE, which is performed in four steps.

First, the UE may transmit message 1 (Msg1) including a random access preamble on a PRACH (see 1701 of FIG. 4(*a*)).

Random access preamble sequences with different lengths may be supported. Along sequence length of 839 may be applied to SCSs of 1.25 and 5 kHz, and a short sequence length of 139 may be applied to SCSs of 15, 30, 60, and 120 kHz.

Multiple preamble formats may be defined by one or more RACH OFDM symbols and different CPs (and/or guard times). A RACH configuration for a cell may be included in SI about the cell and provided to the UE. The RACH configuration may include information on the SCS of the PRACH, available preambles, preamble formats, and so on. The RACH configuration may include information about association between SSBs and RACH (time-frequency) resources. The UE transmits a random access preamble on a RACH time-frequency resource associated with a detected or selected SSB.

The threshold of an SSB for RACH resource association may be configured by the network, and a RACH preamble may be transmitted or retransmitted based on an SSB where reference signal received power (RSRP), which is measured based on the SSB, satisfies the threshold. For example, the UE may select one SSB from among SSBs that satisfy the threshold and transmit or retransmit the RACH preamble based on a RACH resource associated with the selected SSB.

Upon receiving the random access preamble from the UE, the BS may transmit message 2 (Msg2) corresponding to a random access response (RAR) message to the UE (see 1703 of FIG. 4(*a*)). A PDCCH scheduling a PDSCH carrying the RAR may be CRC masked with a random access (RA) radio network temporary identifier (RNTI) (RA-RNTI) and then transmitted. Upon detecting the PDCCH masked by the RA-RNTI, the UE may obtain the RAR from the PDSCH scheduled by DCI carried by the PDCCH. The UE may check whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmit power for retransmitting the preamble based on the most recent path loss and power ramping counter.

The RAR information transmitted on the PDSCH may include timing advance (TA) information for UL synchronization, an initial UL grant, and a temporary cell-RNTI (C-RNTI). The TA information may be used to control a UL signal transmission timing. The UE may transmit a UL signal over a UL shared channel as message 3 (Msg3) of the random access procedure based on the RAR information (see 1705 of FIG. 4(*a*)). Msg3 may include an RRC connection request and a UE identifier. In response to Msg3, the network may transmit message 4 (Msg4), which may be treated as a contention resolution message on DL (see 1707 of FIG. 4(*a*)). Upon receiving Msg4, the UE may enter the RRC_CONNECTED state.

On the other hand, a contention-free random access procedure may be performed when the UE is handed over to another cell or BS or when it is requested by the BS. In the contention-free random access procedure, a preamble to be used by the UE (hereinafter referred to as a dedicated random access preamble) is allocated by the BS. Information on the dedicated random access preamble may be included in an RRC message (e.g., handover command) or provided to the UE through a PDCCH order. When the random access procedure is initiated, the UE may transmit the dedicated random access preamble to the BS. When the UE receives an RAR from the BS, the random access procedure is completed.

As described above, a UL grant in the RAR may schedule PUSCH transmission to the UE. A PUSCH carrying initial UL transmission based on the UL grant in the RAR is referred to as an Msg3 PUSCH. The content of an RAR UL grant may start at the MSB and end at the LSB, and the content may be given as shown in Table 3.

TABLE 3

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

In a contention-free random access (CFRA) procedure, the CSI request field in the RAR UL grant indicates whether the terminal includes aperiodic CSI reporting in the corresponding PUSCH transmission, a subcarrier spacing for Msg3 PUSCH transmission is provided by the RRC parameter. The terminal may transmit PRACH and Msg3 PUSCH on the same uplink carrier in the same service providing cell.

A UL BWP for Msg3 PUSCH transmission is indicated by SystemInformationBlock1 (SIB1).

Figure 5:
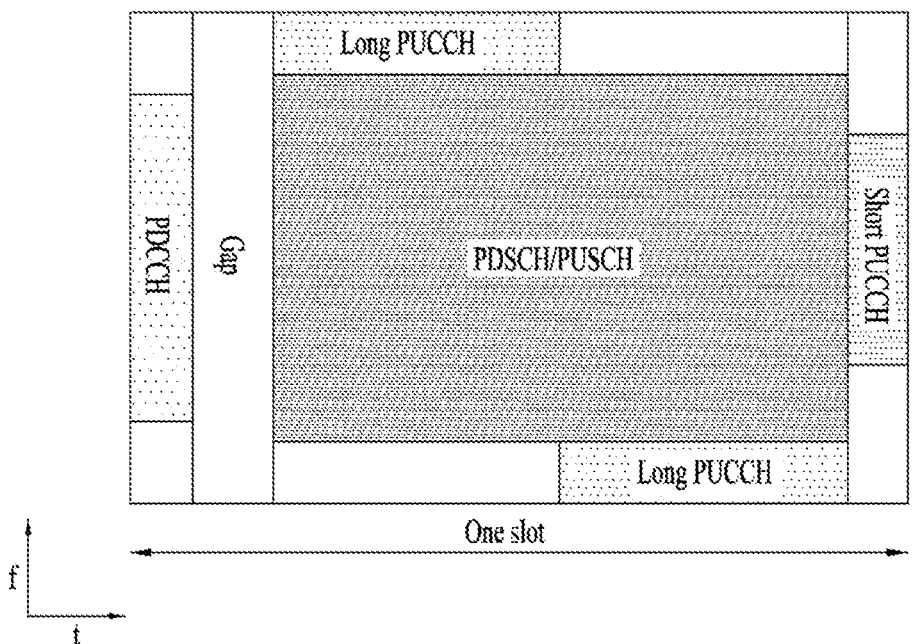
FIG. 5 illustrates an example of physical channel mapping.

FIG. 5 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured through higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicityAndOffset: A PDCCH monitoring periodicity (in slots) and a PDCCH monitoring offset (in slots).

monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL={1, 2, 4, 8, 16}.

* An occasion (e.g., time/frequency resources) in which the UE is to monitor PDCCH candidates is defined as a PDCCH (monitoring) occasion. One or more PDCCH (monitoring) occasions may be configured in a slot.

Table 4 shows the characteristics of each SS.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 5 shows DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be use to schedule a TB-based or TB-level) PUSCH, an DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR (Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Narrower DL BWP for System Information and Paging

Recently, in addition to the 5G main use cases (mMTC, eMBB, and URLLC), importance/interest in a region of a use case across mMTC and eMBB, or mMTC and URLLC has increased. These use cases may include connected industries, smart cities, wearables, and the like. To more efficiently support the above use cases in terms of terminal cost/complexity, power consumption, and the like in a wireless communication system, a new type of terminal differentiated from a conventional NR terminal has been introduced. This new type of terminal may be referred to as a Reduced Capability NR terminal (hereinafter referred to as a RedCap UE/terminal, or RedCap), and to distinguish the new type of terminal from the conventional NR terminal, the conventional NR terminal may be referred to as a non-RedCap UE/terminal, or non-RedCap. A RedCap terminal is cheaper than a non-RedCap terminal and has low power consumption, and in detail, may have all or some of the following features.

A. Features related to complexity reduction:
    Reduced maximum UE bandwidth
    Reduced number of UE RX/TX branches/antennas
    Half-Duplex-FDD
    Relaxed UE processing time
    Relaxed UE processing capability B. Features related to power saving:
    Extended DRX for RRC inactive and/or idle
    RRM relaxation for stationary devices
    Target use cases of a Redcap terminal having the above features may include the following:

1) Connected Industries
    Sensors and actuators connected to a 5G network and a core
    massive industrial wireless sensor network (IWSN)
    Relatively low-cost service requiring small device form factor with several years of battery lifetime in addition to URLLC service with very high requirements
    Requirements for these services are higher than low power wide area (LPWA, i.e., LTE-M/NB-IoT) but lower than URLCC and eMBB
    Pressure sensor, humidity sensor, thermometer, motion sensor, accelerometer, actuator, and the like 2) Smart City
    Data collection and processing to more efficiently monitor and control city resources and provide service
    Essential surveillance camera for factories and industries as well as smart cities 3) Wearables
    Smart watch, ring, eHealth-related device, medical monitoring device, and the like
    Small device and the like
    A RedCap terminal may have lower transmission and reception performance compared to a non-RedCap terminal. A main cause is a decrease in frequency diversity performance due to a decrease in terminal bandwidth. As a supported terminal bandwidth decreases, a decrease width in performance increases.

Considering major use cases of RedCap, such as wearables and massive wireless sensors, traffic congestion is expected because massive connection needs to be supported through a narrow bandwidth.

A method for resolving the above problems, that is, supporting terminal frequency hopping (hereinafter, FH) and supporting traffic offloading (hereinafter TO) is proposed.

In this specification, '( )' may be interpreted as both excluding the contents in ( ) and including the contents in parentheses.

In this specification, '/' may mean including all contents separated by/(and) or including only some of the contents separated by/(or).

Multiple RedCap UE Types and BWP Methods

In this specification, a plurality of different RedCap UE types are supported as follows. In particular, it supports at least two types.

(1) Rel.17 RedCap terminal Rel.17 R-terminal supporting BWP of 20 MHz
(2) Rel.18 RedCap terminal: Rel.18 R-terminal supporting 5 MHz BWP (or sub-BWP of 5 MHz or BW location of 5 MHz)
    1) Option BW1: Both RF and baseband (BB) bandwidths of a terminal support 5 MHz for UL/DL.
    2) Option BW2: The terminal supports a BB bandwidth of 5 MHz and an RF bandwidth of 20 MHz for all UL/DL signal/channels.
    3) Option BW3: Only a BB bandwidth of 5 MHz is supported for a PDSCH (unicast/broadcast PDSCH) and a PUSCH, and an RF bandwidth of 20 MHz for UL/DL is supported. However, up to 20 MHz of UE RF+BB bandwidths are supported for different physical channels and signals.

In the specification, Rel.18 PDSCH or DCI may refer to a PDSCH or DCI for a Rel.18 R-terminal. A Rel-17 PDSCH, a legacy PDSCH, or a pre-Rel.18 PDSCH may refer to a PDSCH for a non-RedCap terminal irrespective of a Rel.17 R-terminal or release, and Rel-17 DCI, legacy DCI, or pre-Rel.18 DCI may refer to DCI for the non-RedCap terminal irrespective of the Rel.17 R-terminal or release.

In the specification, a BWP for the Rel.18 R-terminal may be replaced with a sub-BWP or a BW location, and may have a size 5 MHz or less.

Method of dividing and allocating Initial BWP for general terminal or Rel.17-initial BWP for Rel.17 RedCap terminal into N 5 MHz PDSCHs for Rel.18 terminal For the Rel.18 R-terminal, the BS may divide an Initial BWP for a general terminal or a Rel.17-initial BWP for a Rel.17 RedCap terminal into N 5 MHz to allocate a PDSCH. For example, when the Rel.18 R-terminal is capable of only receiving PDSCH transmission up to 5 MHz, an initial BWP of 20 MHz is divided into N 5 MHz, and to transmit system information or transmit paging, Rel.18 PDSCH(s) may be transmitted in one or multiple specific portions of 5 MHz of an initial BWP of 20 MHz.

Figure 6:
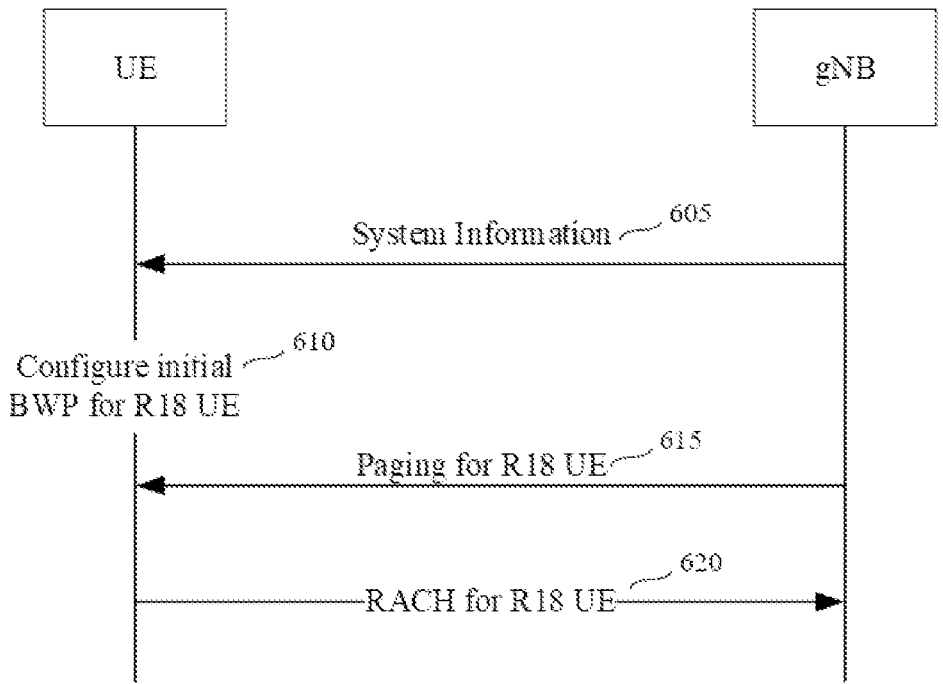
FIG. 6 shows a flow of a method of transmitting and receiving a signal according to an embodiment.

FIG. 6 shows a flow of a method of transmitting and receiving a signal according to an embodiment. Referring to FIG. 6, a terminal may receive system information (605) and configure an initial BWP (610). The terminal may receive a paging signal from a BS (615) and may perform a RACH procedure (620).

Method 1: One DCI Schedules Multiple PDSCH Transmissions in FDM within 20 MHz DL BWP FIG. 7 shows an example of a method of allocating N PDSCH resources according to an embodiment.

For example, when there are a separate Search Space/CORESET for Rel.18 terminals or a separate initial BWP for 5 MHz, a BS may divide a BWP of 20 MHz into more/less than 4 sub-BWPs of 5 MHz or BW locations of 5 MHz. At this time, a set of all sub-BWPs or BW locations may be configured beyond an initial BWP of 20 MHz. For example, when four BW locations of 5 MHz are allocated in a SCS of 15 khz, this may be possible when more than 20 MHz is allocated. This method may be applied to PDSCH transmission for paging or system information. For example, in FIG. 7, in case of paging, a PDCCH may transmit paging DCI, and PDSCHs may correspond to different PDSCHs for different paging sub-groups.

Figure 7:
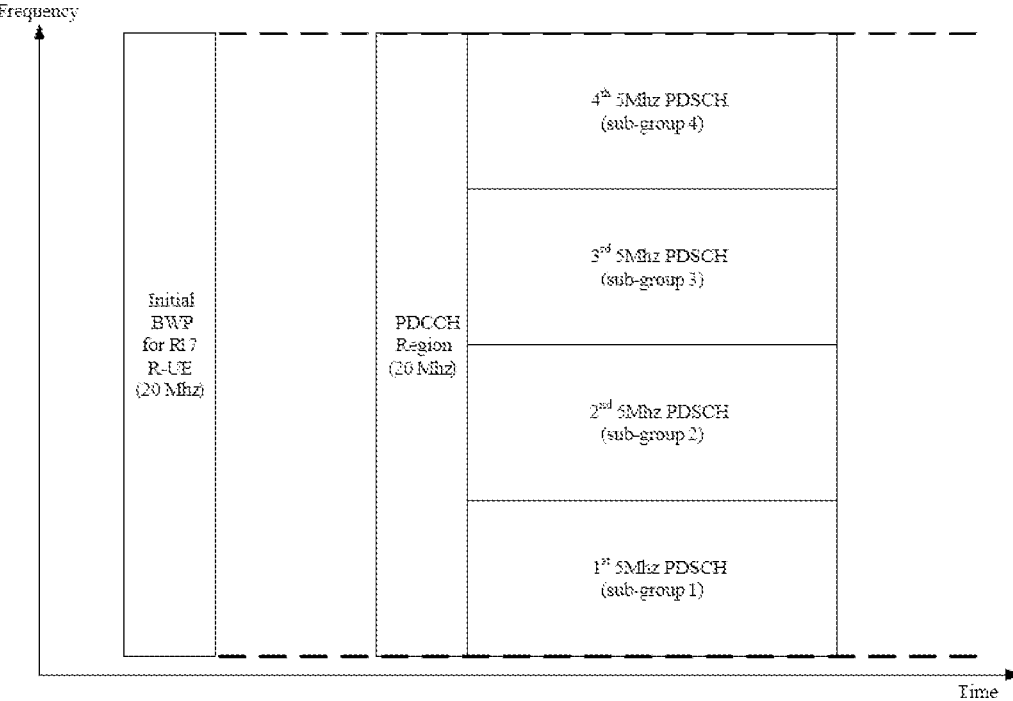
FIG. 7 shows an example of a method of allocating N PDSCH resources according to an embodiment.

As shown in FIG. 7, in the case of a Rel.18 UE monitoring a paging PDCCH on the same MO of a paging group, multiple PDSCH transmissions in FDM may be divided into individual paging sub-groups of the paging group. In this case, the same time domain resource allocation (TDRA) may be applied to all FDMed PDSCHs scheduled by the same DCI. A PDCCH carrying paging DCI may be transmitted within 20 MHz for a UE of option BW3. A PDCCH carrying paging DCI may be transmitted within 5 MHz for a UE of option BW1 or BW2.

When frequency hopping is configured for paging, a PDCCH within 5 MHz may schedule a PDSCH within 5 MHz for a UE of BW1, and here, a PDCCH of 5 MHz and a PDSCH of 5 MHz may be allocated differently in the frequency domain and may or may not overlap in the frequency domain. The UE may not be capable of decoding both a PDCCH of 5 MHz and a PDSCH of 5 MHz in the same slot, and thus a PDCCH of 5 MHz may schedule a PDSCH of 5 MHz in a next (sub)slot (i.e., by cross-slot scheduling). For example, a PDCCH of 5 MHz may be transmitted in a first slot, and a PDSCH of 5 MHz scheduled by a PDCCH of 5 MHz may be transmitted in a second slot after the first slot. There may be zero or one or more slots between the first slot and the second slot.

In FIG. 7, a FDMed PDSCHs are scheduled in the same slot. Alternatively, the FDMed PDSCHs may be scheduled in different slots. For example, a PDSCH of 5 MHz for sub-group1 may be scheduled in a first slot by a PDCCH in the first slot, a PDSCH of 5 MHz for sub-group 2 may be scheduled in a second slot by the PDCCH in the first slot, a PDSCH of 5 MHz for sub-group 3 may be scheduled in a third slot by the PDCCH in the first slot, and a PDSCH of 5 MHz for sub-group 4 may be scheduled in a third or fourth slot by the PDCCH in the first slot. The same or different multiple transmissions of PDSCH of 5 MHz in 5 MHz may be scheduled by the same DCI or different DCIs within 20 MHz. A PDSCH of 5 MHz may be scheduled entirely or partially outside of 20 MHz of a PDCCH or within 20 MHz of a PDCCH. The same TDRA may be applied to multiple transmissions of a PDSCH of 5 MHz in the same or different slots.

In the TDRA methods, a value K0 corresponding to a difference between DCI transmission and PDSCH transmission may be configured as an RRC message or as a fixed value K0. Alternatively, DCI may indicate the value K0. The K0 value may be separately configured or indicated for each BW option. For example, an RRC message or DCI sets/instructs a value K0 for each option, and at this time, a terminal of the BW2 option may set/instruct a smaller value K0 than a terminal of the BW1 option. The K0 value may configure a time gap between DCI and PDSCH as a slot level difference or a symbol level difference.

In the case of a Rel.18 UE, a sub BWP or BW location in an (initial) BWP for frequency domain resource allocation (FDRA) may be determined as follows:
(1) Opt A: Location of 5 MHz for PDSCH is Configured According to Rel.18 Rule for Each UE Group or RRC Message (e.g., Based on UE ID).

The Rel.18 UE may be configured at a predefined BW location to receive a PDSCH within 5 MHz. For example, in FIG. 7, a specific UE may be configured to a PDSCH of a paging sub-group 3 scheduled within a third location of 5 MHz according to a predefined rule. The predefined rule may be configured based on a UE ID of a UE (e.g., s-TMSI, resume ID, or C-RNTI) or according to system information and/or UE-dedicated signaling. The predefined BW location may have a width of 5 MHz, 5 MHz or more, or 5 MHz or less and may be configured to a DL (sub)BWP of the Rel.18 UE. The UE may monitor a PDCCH within a predefined location of 5 MHz and the PDCCH may schedule a PDSCH with a predefined BW location. The predefined BW location of the PDCCH may be the same as or different from the predefined BW location of the PDSCH of the PDCCH.

The predefined BW location may be configured to a sub-BWP of the UE or an (initial) BWP of the UE. The predefined BW location may be configured or reconfigured by system information or UE-dedicated signaling.
(2) Opt B: Dynamic Allocation of Location of 5 MHz for PDSCH For an entire frequency domain (e.g., 20 MHz) of an (initial) BWP, when a terminal receives DCI and the DCI includes an index/indicator of a specific sub-BWP or a pre-defined BW location, the PDSCH scheduled by the DCI may be received in the indicated specific sub-BWP or pre-defined BW location.

One of UE Opt A or B may be used or both Opt A and B may be used. For example, even if a location of 5 MHz is pre-defined, DCI indicating cross-slot scheduling may change a location of 5 MHz of the scheduled PDSCH.

1) Opt B1: Method of indicating index/indicator of specific sub-BWP or pre-defined BW location by specific bits or new field in FDRA field of DCI for entire frequency domain (e.g., 20 MHz) of an (initial) BWP For example, when DCI of a PDCCH of FIG. 7 is received, if 20 MHz is divided into 4 sub-BWPs, 2 bit MSB or 2 bit LSB of FDRA indicates a specific sub-BWP or a pre-defined BW location. A terminal receiving the DCI receives a PDSCH scheduled by DCI in the indicated sub-BWP or pre-defined BW location.

2) Opt B2: DCI includes a field in the form of a bitmap, each bit of a bitmap indicates a specific sub-BWP or a pre-defined BW location, and the DCI indicates the same RIV for one or multiple sub-BWPs indicated by the bitmap.

For example, when DCI is received through a PDCCH of FIG. 7, if a bitmap is 0011, the same RIV is applied to PDSCH transmission of a third or fourth sub-BWP or pre-defined BW location.

In the above methods, 2 bit MSB or 2 bit LSB in FDRA bits of DCI may also indicate a location of a sub-BWP of 5 MHz or a pre-defined BW location.

For example, for paging or system information, DCI may schedule various Rel.18 PDSCHs in the time domain with different K0 values as follows:
K0=1: Rel.18 PDSCH1
K0=2: Rel.18 PDSCH2
K0=3: Rel.18 PDSCH3
K0=4: Rel.18 PDSCH4
In the FDM of FIG. 7, 4 PDSCHs may be allocated in the time domain with different K0 values as described above.

Method 2: One DCI Schedules More than One Rel.18 PDSCH Transmission within or Outside Pre-Rel.18 DL BWP for Rel.18 RedCap UEs For example, Rel.18 PDSCH transmission as well as Rel-17 PDSCH transmission may schedule using Rel-17 Search Space/CORESET or Rel-17 initial BWP. In this case, the Rel-17 PDSCH may transmit Rel-17 paging or system information and Rel.18 PDSCH may transmit Rel.18 paging or system information. A BS may transmit the Rel.18 PDSCH within or outside Rel-17 initial BWP and configure a sub-BWP or BW location for separate Rel.18 for Rel.18 PDSCH transmission within or outside Rel-17 initial BWP.

In this method, legacy DCI for Pre-release 18 may schedule Pre-release PDSCH and Rel.18 PDSCH transmission together. Thus, pre-Rel.18 terminals and Rel.18 terminals may monitor monitoring occasion (MO) or paging occasion according to a configuration. In this case, reserved bits of legacy DCI for Rel.18 PDSCH transmission may include the following FDRA or TDRA information.

1) Opt 2-1: Reserved Bits of Legacy DCI Indicate FDRA (e.g., Resource Indicator Value (RIV) of Allocation Type 1) for Transmission of Rel.18 PDSCH.

TDRA applied to legacy PDSCH in DCI is also applied to Rel.18 PDSCH.

(i) Opt 2-1A: A K0 value and SLIV applied to the existing PDSCH are also applied to the Rel.18 PDSCH.

(ii) Opt 2-1B: SLIV applied to a legacy PDSCH is also applied to Rel.18 PDSCH transmission. However, a separate K0 value is applied to the legacy PDSCH and Rel.18 PDSCH, and reserved bits in legacy DCI indicate a separate K0 value.

2) Opt 2-2: Reserved Bits of Legacy DCI Indicates TDRA for Rel.18 Transmission.

The FDRA applied to the legacy PDSCH in the DCI is also applied to the Rel.18 PDSCH. The FDRA applied to the legacy PDSCH in the DCI is reflected in the sub BWP of 5 MHz or BW location for Rel.18 PDSCH.

(i) Opt 2-2A: SLIV applied to the legacy PDSCH is also applied to Rel.18 PDSCH transmission. However, a separate K0 value is applied to the legacy PDSCH and Rel.18 PDSCH, and reserved bits in the legacy DCI indicate a separate K0 value.

(ii) Opt 2-2B: A separate K0 value and SLIV value are applied to the existing PDSCH and Rel.18 PDSCH, and the separate K0 value and SLIV are indicated as reserved bits of the existing DCI.

For example, DCI may schedule one Rel-17 paging PDSCH and two Rel.18 paging PDSCHs in the time domain with different K0 values as follows.

K0=1: Rel-17 paging PDSCH
K0=2: Rel.18 paging PDSCH1
K0=3: Rel.18 paging PDSCH2

3) Opt 2-3: Reserved Bits of Legacy DCI Indicates Both FDRA and TDRA for Rel.18 PDSCH Transmission.

(i) Opt 2-3A: In the case of TDRA, SLIV applied to the legacy PDSCH is also applied to Rel.18 PDSCH transmission. However, a separate K0 value is applied to legacy PDSCH and Rel.18 PDSCH, and reserved bits in legacy DCI indicate a separate K0 value.

(ii) Opt 2-3B: In the case of TDRA, a separate K0 value and a SLIV value are applied to the legacy PDSCH and the Rel.18 PDSCH, and a separate K0 value and SLIV are indicated as reserved bits in the legacy DCI.

(iii) Opt 2-3C: In the case of FDRA allocation type 1, a separate RIV value is applied to the legacy PDSCH and the Rel.18 PDSCH, and a separate RIV value is indicated by reserved bits of legacy DCI and applied to Rel.18 (sub)BWP or BW location. For example, bandwidth of 5 MHz.

(iv) Opt 2-3D: In the case of FDRA allocation type 0, a separate RBG bitmap is applied to the legacy PDSCH and the Rel.18 PDSCH, and a separate RBG bitmap is indicated as reserved bits of the legacy DCI and applied to Rel.18 (sub)BWP or BW locations. For example, bandwidth of 5 MHz.

Figure 8:
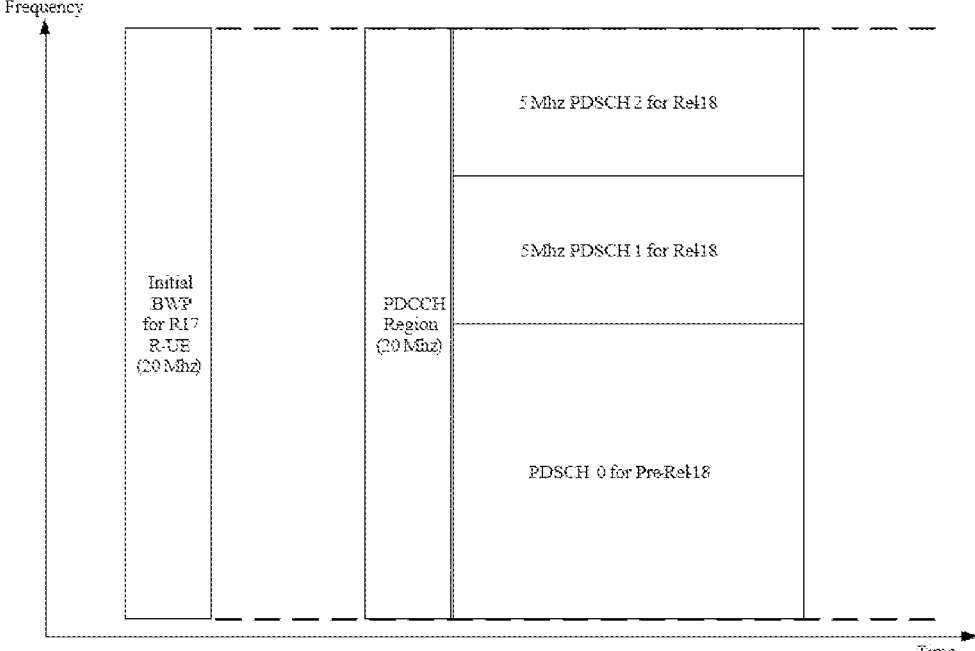
FIG. 8 shows an example of allocation of a PDSCH resource within 20 MHz according to an embodiment.
Figure 9:
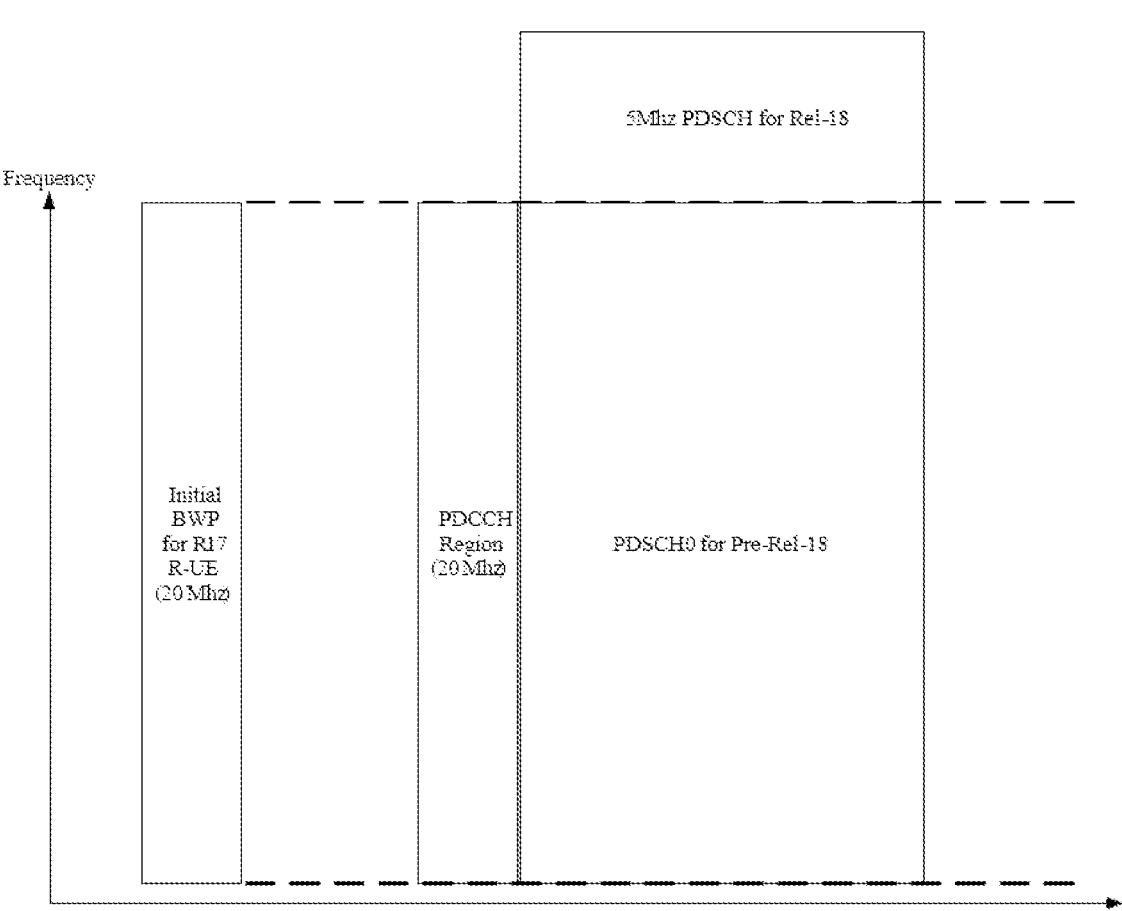
FIG. 9 shows an example of allocation of a PDSCH resource outside 20 MHz according to an embodiment.

FIGS. 8 and 9 show an example of Rel.18 PDSCH resource allocation using Opt 2-1. FIGS. 8 and 9B show a method in which the same TDRA is applied to the legacy PDSCH and the Rel.18 PDSCH but different FDRAs are applied. FIG. 8 shows the case in which a plurality of Rel.18 PDSCHs scheduled by the DCI are included in the legacy initial BWP (Rel.18 PDSCH resource allocation within 20 MHz). FIG. 9 shows a case in which there is one Rel.18 PDSCH scheduled by the DCI and is not included in the legacy initial BWP (Rel.18 PDSCH resource allocation outside 20 MHz). FIG. 10 shows an example of Rel.18 PDSCH resource allocation using Opt 2-2 or Opt 2-3. As shown in FIG. 10, FDRA bits for the legacy PDSCH according to Opt 2-2 may be applied to 5 MHz for Rel.18 PDSCHs of a next slot. In addition, as shown in FIG. 10, FDRA and TDRA different from the legacy PDSCH may be applied to 5 MHz of Rel.18 PDSCH (s) according to Opt 2-3.

Among the PRBs determined as FDRA of the legacy PDSCH in FIG. 10, FDRA of Rel.18 PDSCH may be determined only from frequency resources belonging to a (sub-)BWP or a BW location (e.g., 5 MHz) of Rel.18.

FIG. 9 may not be an appropriate configuration for the BW3 option.

Method 3: Rel.18 FDRA Allocation Type 0 and Type 1 Method of 5 MHz PDSCH Transmission for Rel.18 R-Terminal For PDSCH frequency resource allocation in the (sub-) BWP or BW location of Method 1 or Method 2, Method 3 may be applied as follows.

In the case of Rel.18 UE, for a sub BWP or BW location within an (initial) BWP, frequency domain resource allocation (FDRA) may be determined as follows:

(1) FDRA Allocation Type0

As shown in FIG. 11, the existing FDRA allocation type 0 may be based on the determined RBG size and the number of RBGs.

1) Opt A1-1: (In the box), when a PDSCH resource is allocated according to FDRA allocation type0, if a total number of RBGs and PRBs are calculated, a BWP size is calculated in units of a sub-BWP size or pre-defined BW location size (e.g., 5 MHz). For example, UE1 and UE2 belonging to different paging sub-groups receiving the same paging DCI apply the same FDRA to lower 5 MHz and upper 5 MHz, respectively, and apply the RBG bitmap of the DCI received for 5 MHz to determine a PDSCH resource location for 5 MHz.

2) Opt A1-2: When a PDSCH resource is allocated according to FDRA allocation type0, DCI indicates RBGs of an entire BWP (e.g., 20 MHz) as a bitmap like in the conventional case, and a specific terminal determines the location of a PDSCH to be received using only RBGs for the sub-BWP or pre-defined BW location configured for the specific terminal.

In this case, the bitmap of the DCI may be configured as follows.

i) Opt A1-2a: The DCI includes a bitmap field for each sub-BWP or each pre-defined BW location. That is, the DCI includes one or more fields for one or more sub-BWPs or pre-defined BW locations.

ii) Opt A1-2b: The DCI includes one bitmap field, and one bitmap indicates FDRAs for a plurality of sub-BWPs or pre-defined BW locations. The terminal finds start/end positions of bits mapped to an own sub-BWP or pre-defined BW location of the terminal in the bitmap and applies FDRA for the PDSCH of an own sub-BWP or pre-defined BW location of the terminal.

As such, the terminal calculates the start/end position for all sub-BWP or pre-defined BW locations of the corresponding BWP within the bitmap, and accordingly, the terminal finds bits within the bitmap for an own sub-BWP or pre-defined BW location of the terminal and applies FDRA.

iii) Opt A1-2c: The DCI receives the PDSCH with only RBGs belonging to an own sub-BWP thereof in the bitmap for all RBGs of the BWP as in the conventional case.

At this time, when a boundary of the sub-BWP or pre-defined BW location divides the RBG near the boundary, one of the following two methods may be determined.

i) An RBG near the boundary is configured only with the RBG part included in the sub-BWP or pre-defined BW location. Therefore, a size of RGB near the boundary is determined to be smaller than the other RBG sizes; or ii) The RBG part included in the sub-BWP or pre-defined BW location is included as a part of the adjacent RBG. Thus, the size of an adjacent RBG increases by the part of the included RBG.

(2) FDRA Allocation Type1

When a PDSCH resource is allocated according to FDRA allocation type 1, different RB starts may be configured for each Sub-BWP as follows.

1) Opt A2-1: A BS may pre-designate an RB start value for each terminal or terminal group. According to a configuration of the BS, the terminal determines a RB start value associated with a UE ID or a paging sub-group.

For example, in the DCI received through the PDCCH of FIG. 7, the RIV of the DCI indicates the lowest RB start value, a reference RB start value, or RB start=0. The terminal receiving the DCI configures RB start for each sub-BWP or each pre-defined BW location. For example, when RIV of paging DCI is indicated as RB start=0, UE1 with sub-BWP1 and UE2 with sub-BWP2 apply RB start1 and RB start2, respectively, to calculate their FDRAs. As a result, the DCI indicating RB start=0 indicates only the RB length common to sub-BWP, and RB start may be semi-statically designated as an RRC message for each terminal or terminal group.

2) Opt A2-2: The terminal determines whether to receive the PDSCH by determining whether resource allocation exists in an own sub-BWP or pre-defined BW location thereof according to the RIV value of the DCI.

For example, the terminal configures a sub-BWP or pre-defined BW location configured therefor (configure a terminal group to which the terminal belongs) within an initial BWP. Then, when DCI is received through the PDCCH of FIG. 7, contiguous PRBs for all PDSCHs in the initial BWP are calculated according to the RIV value of DCI, and a PDSCH transmission resource is calculated using only PRBs located within a sub-BWP or pre-defined BW location configured therefor to receive the corresponding PDSCH.

3) Opt A2-3: The terminal calculates N PRB sets by dividing all contiguous PRBs according to a RIV value of DCI by 1/N, and selects one PRB set to receive the PDSCH. At this time, when the selected PRB set partially overlaps or does not overlap an own sub-BWP or pre-defined BW location frequency domain thereof, the terminal may re-tune according to the PRB set.

For example, when DCI is received through the PDCCH of FIG. 7, contiguous PRBs for all PDSCHs in the initial BWP are calculated according to the RIV value of DCI, and all contiguous PRBs allocated according to the received RIV are divided by 1/N to calculate N A PRB sets and to select a PRB set.

i) At this time, the terminal selects one PRB set from N PRB sets based on the index of the sub-BWP to which the terminal belongs, the pre-defined BW location index, the paging sub-group index, or a UE ID of the terminal and receives a PDSCH according to the selected PRB set; or ii) At this time, the terminal selects a PRB set belonging to the frequency domain of an own sub-BWP or pre-defined BW location of the terminal. When there are multiple selected PRB sets, all PRB sets are selected, or one PRB set with the largest number of PRBs is selected.

4) Opt A2-4: DCI separately indicates an RIV value for each sub-BWP, each pre-defined BW location, or each sub-group. At this time, a DCI field may be configured as follows.

i) OptA2-4a: An RIV value for each sub-BWP or each pre-defined BW location is indicated as a different field for each sub-BWP or each pre-defined BW location in the DCI.

ii) OptA2-4b: An RIV value for each sub-BWP or each pre-defined BW location is indicated for one field in DCI.

In this case, the terminal recognizes a start/end position of an RIV bit for a sub-BWP or pre-defined BW location of the terminal in consideration of all sub-BWPs or pre-defined BW locations within a BWP.

iii) Opt A2-4c: RB start values for a different sub-BWP or pre-defined BW location from the RIV value calculated based on RB start=0 or the lowest/highest/ref sub-BWP are included in one or separate field.

For example, an RIV value of DCI is indicated based on RB start=0, and the corresponding DCI additionally include RB start1 for UE1 and RB start2 for UE2.

An FDRA bit size in DCI may be determined using a sub-BWP size or a pre-defined BW size (e.g., 5 MHz) instead of CORESET0 size.

The methods may also be applied to terminals of other BW1/BW2 options as well as BW3 option. For example, after receiving DCI of 5 MHz, a terminal of BW1/2 option may receive a PDSCH of 5 MHz by hoping a sub-BWP or a pre-defined BW location. In this case, DCI of 5 MHz and the frequency domain of 5 MHz of a PDSCH of 5 MHz therefor may be differently allocated.

The terminal may determine whether to receive a specific PDSCH of 5 MHz according to allocation of the FDRA. For example, as the calculation result of FDRA of the PDSCH, when there is no PDSCH transmission resource within a sub-BWP or pre-defined BW location of the terminal, a PDSCH for the DCI is not received. Alternatively, there is no PDSCH transmission resource within a sub-BWP or pre-defined BW location of the terminal, a PDSCH of 5 MHz may be received via re-tuning.

Sub-BWP (or Pre-Defined BW Location) Operation Method of Rel.18 R-Terminal

The Rel.18 R-terminal receiving the sub-BWP configuration information through system information may select a sub-BWP as follows.

(1) Opt C1: One sub-BWP is selected among N sub-BWPs based on a terminal-dedicated UE ID (e.g., s-TMSI or C-RNTI or I-RNTI).

For example, the same sub-BWP index as a value of UE ID mod N is selected and a sub-BWP corresponding thereto is selected.

(2) Opt C2: One sub-BWP is selected among N sub-BWPs according to a UE type of a terminal.

For example, 1 RX terminal selects sub-BWPIndex=0, 2 RX terminal selects sub-BWPIndex=1, Half-Duplex terminal selects sub-BWPIndex=2, Full-Duplex terminal selects sub-BWPIndex=3, 20 MHz terminal selects sub-BWPIndex=4, and 5 MHz terminal selects a sub-BWP corresponding to sub-BWPIndex=5.

(3) Opt C3: One sub-BWP is selected according to a Paging sub-group to which the terminal belongs.

For example, a sub-BWPIndex mapped according to an index of a sub-group is selected, and a sub-BWP corresponding to the index is selected.

(4) Opt C4: Random selection.

For example, a terminal randomly selects a random value between [0 and 1], and a BS compares the random value with a value of [0, N1, N2, N3, . . . , 1] transmitted using system information to select one sub-BWP. For example, when the random value is between [0 and N1], sub-BWP-Index=0 is selected, when the random value is between [N1 and N2], sub-BWPIndex=1 is selected, and when the random value is between [N2 and N3], sub-BWPIndex=3 or the like is selected, and in this case, a sub-BWP corresponding to the index is selected.

(5) Opt C5: A sub-BWP is selected according to cell quality measured by the terminal.

For example, when an RSRP measurement value of a serving cell is equal to or greater than a Q0 value, sub-BWP=0 is selected, when the RSRP measurement value is equal to or greater than a Q1 value, sub-BWP=1 is selected, and when the RSRP measurement value is equal to or greater than a Q2 value, sub-BWP=2 or the like is selected, and in this case, a sub-BWP corresponding to the index is selected.

(6) Opt C6: A sub-BWP is selected according to beam quality measured by the terminal.

For example, when an SSB index of a best SSB of a serving cell is 0, 4, sub-BWP=0 is selected, when the SSB index of the best SSB is 1 and 5, sub-BWP=1 is selected, and when the SSB index of the best SSB is 2 and 6, sub-BWP=2, or the like is selected, and in this case, a sub-BWP corresponding to the index is selected.

(7) Opt C7: A sub-BWP is selected according to the purpose designated by the BS.

1) C7-0: The BS may designate a sub-BWP in which R-SIB1 of the Rel.18 R-terminal is located as sub-BWPIndex=0 (hereinafter referred to as sub-BWP0) through the MIB, the DCI scheduling the conventional SIB1, or the conventional SIB1 message. Alternatively, sub-BWPIndex=0 may be configured to always transmit R-SIB1.

Therefore, the Rel.18 R-terminal moves to sub-BWP0 and receives R-SIB1 of the Rel.18 R-terminal after receiving MIB, receiving DCI scheduling conventional SIB1, or receiving a conventional SIB1 message.

Cell-defining SSB or non-cell-defining SSB for Rel.18 R-terminal may be configured in Sub-BWP0. The Rel.18 R-terminal obtains the Rel.18 SSB configuration information from the conventional SIB1 or R-SIB1.

The Rel.18 R-terminal may measure Rel.18 SSB with BS configuration, and apply to idle mobility measurement for cell selection/reselection, or may apply the Rel.18 SSB measurement result to paging monitoring in a sub-BWP, PRACH preamble/resource selection in a sub-BWP, or the like.

2) C7-1: The BS may designate a sub-BWP in which transmission of other system information (i.e., SIBx, x>1) is located to sub-BWPIndex=1 (hereinafter, sub-BWP1) through MIB, DCI scheduling the conventional SIB1, a conventional SIB1 message, or R-SIB1 of a Rel.18 R-ter-minal. Alternatively, sub-BWPIndex=1 may be configured to always transmit other system information.

3) C7-2: The BS may designate a sub-BWP in which transmission of paging is located to sub-BWPIndex=2 (here-inafter, sub-BWP2) through MIB, DCI scheduling the conventional SIB1, a conventional SIB1 message, or R-SIB1 of the Rel.18 R-terminal. Alternatively, sub-BWPIndex=2 may be configured to always transmit paging.

Paging may be transmitted in k sub-BWPs among N sub-BWPs using the alternative method, and in this case, the following methods may be possible. (k=N or k<N)

i) Alt 2A: One sub-BWP is selected among k sub-BWPs and paging is monitored using one method of the Opt C1, C2, C3, C4, C5, and C6.

In this case, a paging search space is configured for all k sub-BWPs.

ii) Alt 2B: A BS or Core Network (CN) Node (e.g., AMF or MMF) selects one sub-BWP indicated to a terminal among k sub-BWPs and monitors paging.

For example, a sub-BWP configured by a paging search space is selected and paging is monitored.

At this time, when the terminal is inactive, the BS may instruct the terminal, and when the terminal is idle, a CN node may instruct the terminal.

iii) Alt 2C: A sub-BWP indicated by the RRC Release message may be selected and paging is monitored.

For example, when the terminal switches from a connected mode to an idle or inactive mode, the BS may indicate sub-BWPIndex through RRC Releasemessage. According to the indicated sub-BWPIndex, a sub-BWP is selected and paging is monitored.

4) C7-3: The BS may designate sub-BWP for performing RACH to sub-BWPIndex=3 (hereinafter sub-BWP3) through MIB, DCI scheduling the conventional SIB1, through the conventional SIB1 message, or R-SIB1 of the Rel.18 R-terminal. Alternatively, RACH may be configured to be always performed in sub-BWPIndex=3.

The Rel.18 R-terminal defines the selected sub-BWP as follows.

(1) Opt D1: A selected sub-BWP is defined as an initial BWP of the Rel.18 R-terminal.

The Rel.18 R-terminal applies the selected sub-BWP to performing of the conventional initial BWP operation.

(2) Opt D2: The selected sub-BWP is defined as a BWP of a specific purpose of the Rel.18 R-terminal.

For example, according to the Option C methods, the selected sub-BWP may be defined as a DL BWP for paging monitoring, defined as a UL/DL BWP for RACH, or may be defined as a UL/DL BWP for SDT.

R-SIB1 Reception of Rel.18 R-Terminal

The Rel.18 R-terminal receives a Rel.18 PDSCH transmitting system information according to the methods 1, 2, and 3. In this case, the DCI of the methods 1, 2, and 3 is DCI having CRC scrambled with SI-RNTI.

When Rel.18 PDSCH transmits R-SIB1 for the Rel.18 R-terminal, the DCI may schedule the Rel.18 PDSCH for the R-SIB1 as follows.

(1) Opt 1: One DCI on CORESET shared by the pre-Rel.18 UE and the Rel.18 UE schedules the pre-Rel.18 SIB1 as well as the Rel.18 R-SIB1 within an initial DL BWP of 20 MHz with FDM (e.g., FIG. 8).

(2) Opt 2: One DCI on CORESET shared by the pre-Rel.18 UE and the Rel.18 UE schedules the pre-Rel.18 SIB1 within an initial DL BWP of 20 MHz as well as the Rel.18 R-SIB1 outside an initial DL BWP of 20 MHz with FDM (e.g., FIG. 9).

(3) Opt 3: One DCI on CORESET shared by the pre-Rel.18 UE and the Rel.18 UE schedules the pre-Rel.18 SIB1 as well as the Rel.18 R-SIB1 within an initial DL BWP of 20 MHz with TDM (e.g., FIG. 10(b)).

The Rel.18 PDSCH transferring the Rel.18 R-SIB1 in the Opt3 is scheduled within a (sub)BWP of 5 MHz or a BW location but the legacy PDSCH transferring the pre-Rel.18 SIB1 is scheduled within an initial BWP of 5 MHz or an initial BWP of 20 MHz.

A BS may indicate whether DCI schedules both the Rel.18 R-SIB1 and the pre-Rel.18 SIB1 through the DCI or MIB as in the Opt.

When the Rel.18 R-terminal receives DCI for scheduling the conventional SIB1 or the conventional SIB1, the Rel.18 R-terminal receives a separate cellBarred parameter for the Rel.18 R-terminal from the conventional SIB1 or DCI for scheduling the conventional SIB1. According to the received cellBarred parameter, whether the Rel.18 R-terminal is capable of accessing a corresponding cell or whether the cell needs to be barred is determined.

When the Rel.18 R-terminal receives a new R-SIB1 or DCI scheduling R-SIB1 without receiving the conventional SIB1, the Rel.18 R-terminal selects the sub-BWP for R-SIB1, and selects the DCI of the selected sub-BWP or a separate cellBarred parameter for the Rel.18 R-terminal from R-SIB1. According to the received cellBarred parameter, whether the Rel.18 R-terminal is capable of accessing the corresponding cell or whether the cell needs to be barred is determined.

When the on-demand SI is configured, the BS may configure a dedicated RACH resource for an on-demand SI request. Alternatively, the dedicated RACH resource may be configured for terminal identification during initial access. As such, for the on-demand SI request or for terminal identification during initial access, the BS distinguishes and assigns the RACH resource for the Rel.17 R-terminal, the RACH resource for the Rel.18 R-terminal, and the RACH resource for a general terminal. In this case, the BS may classify and allocate the RACH resources for the option BW1 terminal, RACH resources for the option BW2 terminal, and RACH resources for the option BW3 terminal for the Rel.18 R-terminal. These different RACH resources may be allocated separately through the existing SIB1 and R-SIB1. In this case, the Rel.18 R-terminal selects a PRACH resource suitable for a terminal type thereof and transmits MSG1 or MSGA. In addition, the Rel.18 R-terminal may be indicated through the (sub-)header of the MAC PDU of MSG3 PUSCH or MSGA PUSCH, or Option BW1, BW2, or BW3 may be indicated according to a terminal type.

Reception of Paging of Rel.18 R-Terminal

The Rel.18 R-terminal receives the Rel.18 PDSCH transmitting the Paging message according to the methods 1, 2, and 3. In this case, the DCI of the methods 1, 2, and 3 is DCI having CRC scrambled with P-RNTI.

DCI for PEI instead of the DCI in the methods 1, 2, and 3 may indicate a (sub-)BWP for the R-terminal or a BW location for receiving the Rel.18 paging PDSCH. Alternatively, the DCI for the PEI instead of the DCI in the methods 1, 2, and 3 may provide FDRA and/or TDRA information for receiving the Rel.18 paging.

When the TRS for paging is configured for the Rel.18 R-terminal, the Rel.18 TRS may be configured as follows.

(1) Opt 1: The TRS for paging of the Rel.18 R-terminal is configured only within an initial BWP, a sub-BWP, or a BW location of 5 MHz for the Rel.18 R-terminal.

When the TRS for the Rel.18 R-terminal performs frequency hopping, the corresponding TRS performs frequency hopping only within an initial BWP, a sub-BWP, or a BW location of 5 MHz for the Rel.18 R-terminal.

(2) Opt 2: The TRS for paging of the Rel.18 R-terminal may be configured outside an initial BWP, a sub-BWP, or a BW location of 5 MHz for the Rel.18 R-terminal. In this case, the TRS is configured within an initial BWP for an Rel.17 R-terminal of 20 MHz.

The Rel.18 R-terminal (in particular, the terminal of the option BW1 or 2) receives the TRS through the RF re-tuning.

FIG. 12 shows a flow of a downlink signal transmission and reception method according to an embodiment.

Referring to FIG. 12, the UE may receive downlink control information (DCI) through a physical downlink control channel (PDCCH) (A05).

The UE may determine a DL resource allocated to the UE based on a frequency domain resource allocation (FDRA) field included in the DCI (A10).

The UE may receive a physical downlink shared channel (PDSCH) on the DL resource (A15).

Based on a first bandwidth of the UE supported for the PDCCH is different from a second bandwidth of the UE supported for the PDSCH, the UE may determine the DL resource allocated through the FDRA field based on the second bandwidth other than the first bandwidth.

The second bandwidth may be smaller than the first bandwidth.

The first bandwidth may be equal to or greater than 5 MHz and the second bandwidth may be equal to or smaller than 5 MHz.

The frequency domain related to the second bandwidth may belong to a first bandwidth part (BWP), and the first BWP may be shared with other UEs supporting reception of a PDSCH of a greater bandwidth than the second bandwidth.

The frequency domain related to the second bandwidth may be one of a plurality of sub-BWPs included in the first BWP.

The DCI may include information for configuring one of the plural sub-BWPs included in the first BWP as the frequency domain related to the second bandwidth.

The UE may determine the DL resource allocated by the FDRA field within the frequency domain related to the second bandwidth.

A total number of resource block groups (RBGs) related to the PDSCH and physical resource blocs (PRBs) may be determined based on the second bandwidth.

Figure 13:
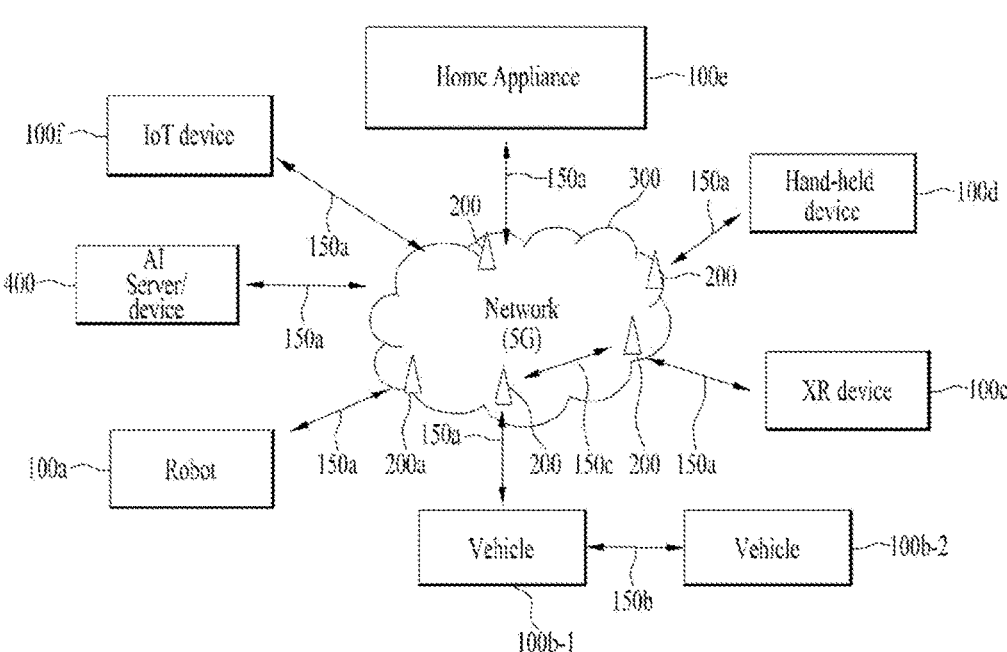
FIGS. 13 and 14 illustrate a communication system 1 and wireless devices applied to the present disclosure.

FIG. 13 illustrates a communication system 1 applied to the present disclosure.

Referring to FIG. 13, a communication system 1 includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An A1 technology may be applied to the wireless devices 100a to 100f and the wireless devices 100a to 100f may be connected to the A1 server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
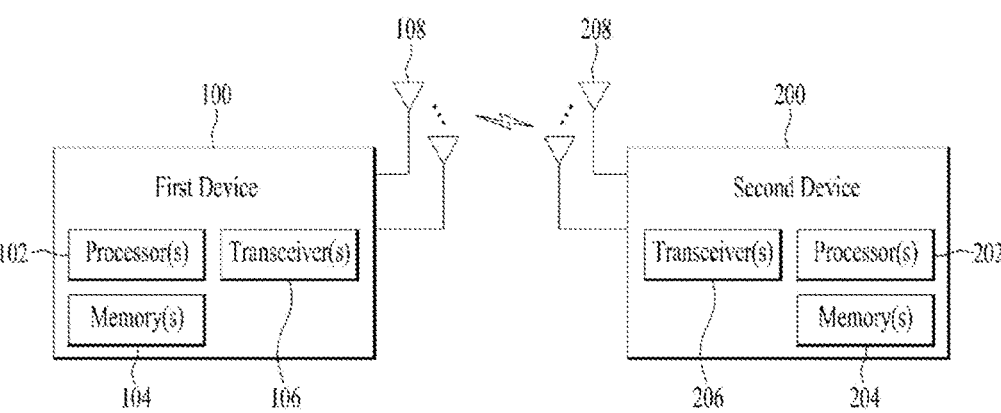

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flow-charts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
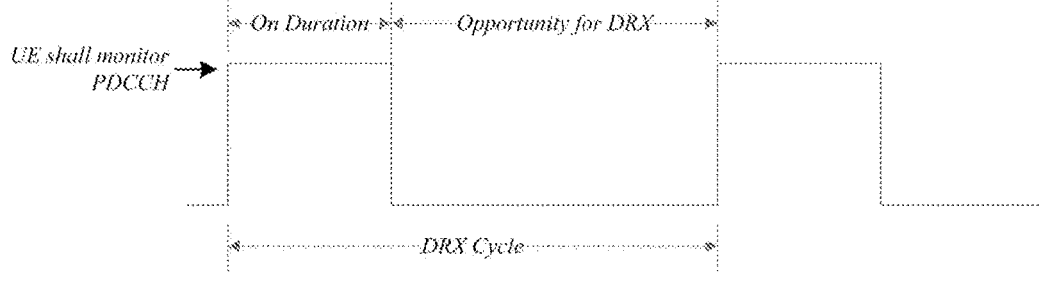
FIG. 15 illustrates discontinuous reception (DRX) operation applicable to the present disclosure.

FIG. 15 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

A DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method performed by a user equipment (UE), the method comprising:
receiving, through a downlink control channel, downlink control information including a first field for frequency domain resource allocation and a second field for time domain resource allocation;
determining a downlink resource allocated to the UE based on the first field and the second field; and
receiving a first downlink data channel in the downlink resource,
wherein the downlink control information schedules a plurality of downlink data channels including the first downlink data channel,
wherein the plurality of downlink data channels are transmitted in a plurality of sub-bandwidths which are frequency divisionally multiplexed in a bandwidth for the downlink control channel, and
wherein a first sub-bandwidth for the first downlink data channel is determined among the plurality of sub-bandwidths based on a UE identification configured in the UE.

2. The method of claim 1, wherein a size of the bandwidth of the downlink control channel is 20 MHZ, and a size of each sub-bandwidth is 5 MHz.

3. The method of claim 1, wherein the UE determines the frequency domain resource allocation of the first field based on a location of the first sub-bandwidth.

4. The method of claim 1, wherein a total number of resource block groups related to the first downlink data channel and physical resource blocks are determined based on the first sub-bandwidth.

5. A non-transitory processor-readable recording medium having recorded thereon a program for performing the method of claim 1.

6. The method of claim 1, wherein the same time domain resource allocation is applied for the plurality of the downlink data channels.

7. A device comprising:
a memory configured to store instructions; and
a processor configured to perform operations by executing the instructions,
wherein the operations of the processor comprise:
receiving, through a downlink control channel, downlink control information including a first field for frequency domain resource allocation and a second field for time domain resource allocation;
determining a downlink resource allocated to the device based on the first field and the second field; and
receiving a first downlink data channel in the downlink resource; and
wherein the downlink control information schedules a plurality of downlink data channels including the first downlink data channel,
wherein the plurality of downlink data channels are transmitted in a plurality of sub-bandwidths which are frequency divisionally multiplexed in a bandwidth for the downlink control channel, and
wherein a first sub-bandwidth for the first downlink data channel is determined among the plurality of sub-bandwidths based on a UE identification configured in the device.

8. The device of claim 7, further comprising:
a transceiver configured to transmit and receive a wireless signal under control of the processor,
wherein the device is a user equipment (UE).

9. The device of claim 7, wherein the device is an application specific integrated circuit (ASIC) or a digital signal processing device.

10. A base station (BS) comprising:
a memory configured to store instructions; and
a processor configured to perform operations by executing the instructions,
wherein the operations of the processor comprise:
transmitting, to a user equipment (UE), through a downlink control channel, downlink control information including a first field for frequency domain resource allocation and a second field for time domain resource allocation; and
transmitting a first downlink data channel in a downlink resource allocated to the UE based on the first field and the second field,
wherein the downlink control information schedules a plurality of downlink data channels including the first downlink data channel,
wherein the plurality of downlink data channels are transmitted in a plurality of sub-bandwidths which are frequency divisionally multiplexed in a bandwidth for the downlink control channel, and
wherein a first sub-bandwidth for the first downlink data channel is determined among the plurality of sub-bandwidths based on a UE identification configured in the UE.

* * * * *